No. 630,312. Patented Aug. 8, 1899.
W. H. BAILEY.
APPARATUS FOR RECORDING MOVEMENTS OF RAILWAY TRAINS, &c.
(Application filed June 3, 1899.)
(No Model.) 2 Sheets—Sheet 1.
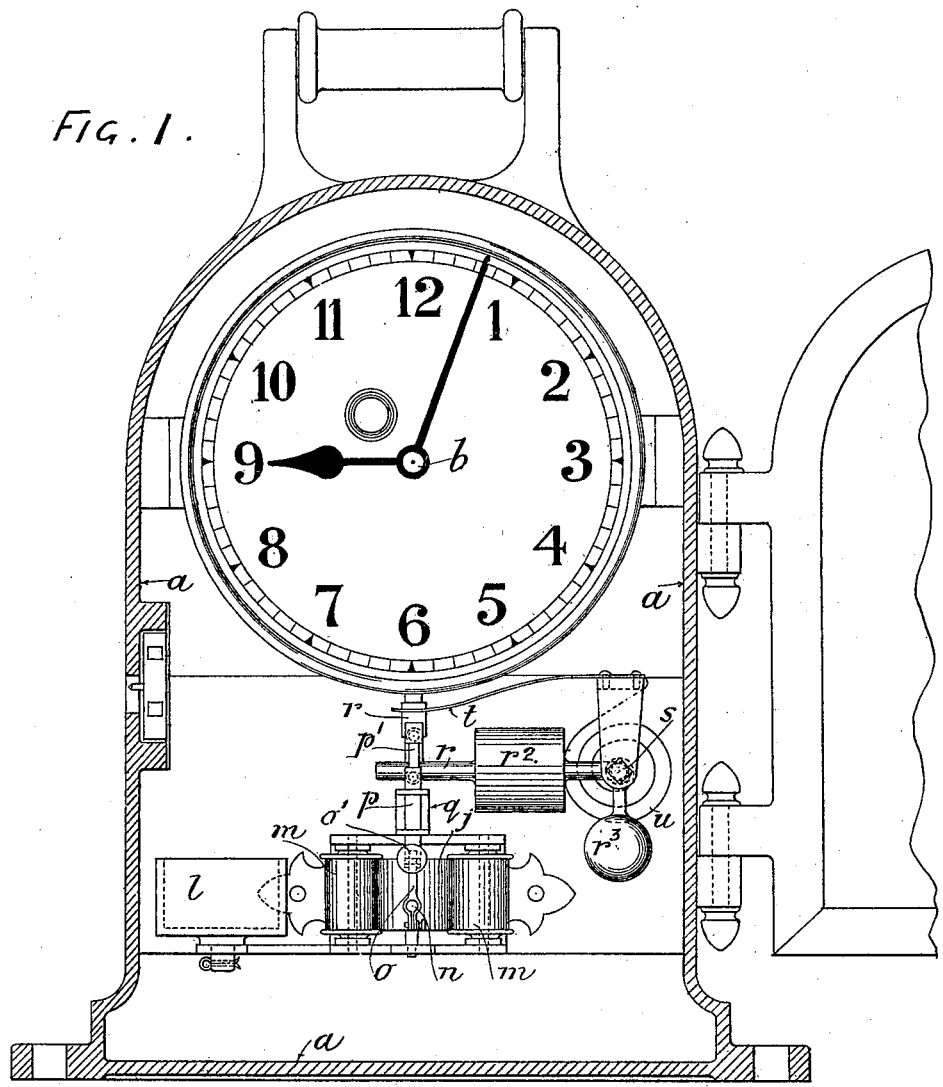
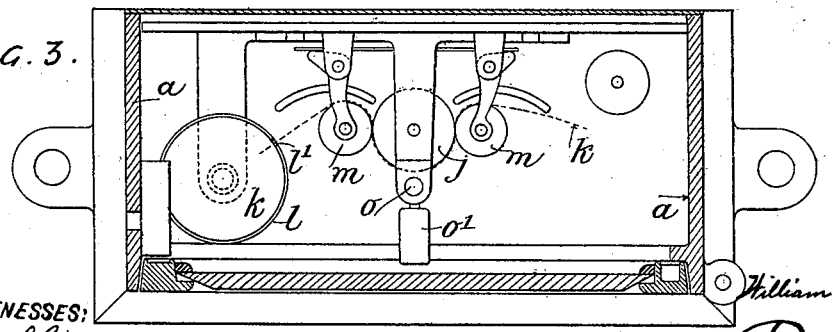

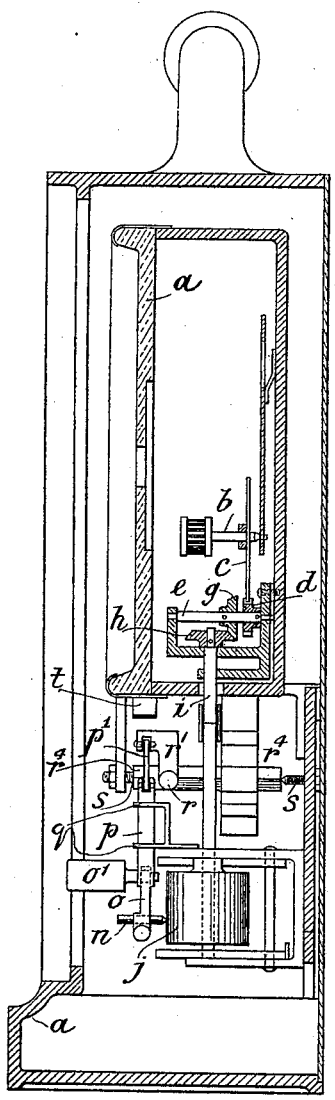
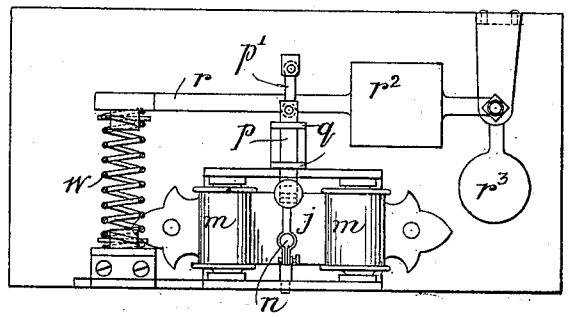
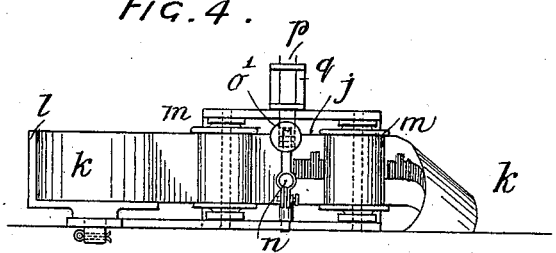

UNITED STATES PATENT OFFICE.

WILLIAM HENRY BAILEY, OF SALFORD, ENGLAND.

APPARATUS FOR RECORDING MOVEMENTS OF RAILWAY-TRAINS, &c.

SPECIFICATION forming part of Letters Patent No. 630,312, dated August 8, 1899.

Application filed June 3, 1899. Serial No. 719,277. (No model.)

*To all whom it may concern:*

Be it known that I, WILLIAM HENRY BAILEY, knight, a subject of the Queen of Great Britain, residing at Albion Works, Salford, in the county of Lancaster, England, have invented certain new and useful Improvements in Apparatus for Recording the Movements of Railway-Trains and the Like, of which the following is a specification.

My invention relates to an apparatus for recording the movements of railway-trains, carriages, steamships, lifts, tram-cars, automotors, and the like, and has for its object to record the time when the train is in motion and when it stops, as at stations; also, to indicate any unusual jolt caused by passing over a loose or badly-fitted fish-plate, and in tramp or other steamships to indicate the times when the ship was in port and also when exceptionally rough weather was experienced, and in lifts to indicate how often the carriage travels.

In the accompanying two sheets of drawings, Figure 1 is an elevation, partly a section, of the entire apparatus. Fig. 2 is a vertical section of the apparatus. Fig. 3 is a sectional plan showing the coil of paper tape and the rollers for actuating and guiding the same. Fig. 4 is a detail view of the paper tape and its rollers, showing the tape partly marked by the recording-pencil. Fig. 5 is a view of the alternative mode of mounting the holder of the recording-pencil.

In the views, $a$ designates the casing of a clock, preferably an eight-day clock, and $b$ the rotating hand-spindle on which is fixed the usual toothed wheel $c$, one of the intermediate wheels of the clock-movement and which I utilize to drive by a pinion $d$ a spindle $e$. On the spindle $e$ is fixed a bevel-pinion $g$, which drives by a similar pinion $h$ a vertical spindle $i$, which forms the axle of a drum $j$. A coiled paper tape $k$ is placed in a suitable holder $l$ and led thence through a slot $l'$ over the surface of the driven drum $j$, upon which it is stretched and held by two spring clipping-rollers $m$, which are pressed against the paper on said drum. The paper tape $k$ is marked as it passes over the surface of the rotating drum $j$ by a pencil $n$, carried in a holder $o$, which is weighted at $o'$ and is pivoted to one end of a rod $p$, fitted to move up and down vertically in guides $q$. The other end of the rod $p$ is connected by a link $p'$ to an arm $r'$, cast on a lever $r$, which is weighted at $r^2$ and $r^3$. The lever $r$ is formed with a cross piece or bar $r^4$, the ends of which are countersunk to receive the points of two steel center bits $s$, which form the centers upon which the lever $r$ works. In addition to the weights $r^2$ and $r^3$, which counterbalance one another, the vibratory movements of the lever $r$ are restrained at its front end by a plate-spring $t$ and at its rear end by a connected helical spring $u$, or alternatively, as shown in Fig. 5, by a single coiled spring $w$, connected to the front end of the lever and to the casing.

The clock-casing, with the parts inclosed, may be placed on any convenient part of a railway-train, carriage, steamship, lift, or other moving body, and when, say, the train is in motion the vibration set up causes the counterbalanced horizontal lever $r$ to oscillate up and down, and this movement being transmitted to the holder $o$ and pencil $n$ causes the latter to mark a zigzag line on the paper tape $k$ as it travels over and with the surface of the rotating drum $j$. During ordinary vibration the lever $r$ oscillates practically uniformly and within certain limits; but when an excessive vibration due to a sudden jerk takes place the springs $t$ and $u$ yield momentarily and allow the pencil to mark an extraordinary or elongated line on the paper tape $k$, thus indicating in diagrammatic form that an imperfection in the permanent way existed at a certain point. When the train stops at a station or elsewhere, the instrument comes to rest and the pencil, ceasing to vibrate, marks a continuous straight line, which denotes the length of the stoppage of the train.

What I claim, and desire to secure by Letters Patent of the United States, is—

In combination in a recording device, the clock-casing, a roller driven from the clock-spindle, a continuous paper strip fed over said roller by the rotation of the latter, an angular pivoted lever having a weighted, vertical and horizontal member, a recording-pencil, a weighted holder therefor, a vertically-guided rod pivoted thereto, and a link connecting said arm to one member of said angular lever, substantially as described.

In witness whereof I have hereunto set my hand in presence of two witnesses.

WILLIAM HENRY BAILEY.

Witnesses:
 HERBERT R. ABBEY,
 HERBERT R. ABBEY, Jr.